US000001113H

United States Statutory Invention Registration [19]

[11] Reg. Number: H1113

[43] Published: Dec. 1, 1992

Yoshizaki

[54] APPARATUS FOR SUPPLYING POWER TO ELECTRICALLY HEATED CATALYST CONVERTER

[76] Inventor: Kouji Yoshizaki, 701-1, Nakatokari, Nagaizumicho, Sunto-Gun, Shizuoka-ken, Japan

[21] Appl. No.: 839,625

[22] Filed: Feb. 21, 1992

[30] Foreign Application Priority Data

Mar. 4, 1991 [JP] Japan ..... 3-37346

[51] Int. Cl.[5] ..... F01N 3/28; F01N 9/00

[52] U.S. Cl. ..... 60/284; 60/299; 123/2; 123/179.21

[58] Field of Search ..... 60/274, 284, 286, 300, 60/303, 320; 219/508, 492, 202, 206; 123/142.5 E, 179.6, 179.21

[56] References Cited

U.S. PATENT DOCUMENTS

| | | | |
|---|---|---|---|
| 4,102,127 | 7/1978 | Saiki et al. | 60/284 |
| 4,274,132 | 6/1981 | Molyneux-Berry | 219/69.13 |
| 4,928,485 | 5/1990 | Whittenberger | 60/299 |
| 5,050,545 | 9/1991 | Shirata et al. | 123/179.21 |
| 5,105,776 | 4/1992 | Tsuchiya et al. | 123/2 |

FOREIGN PATENT DOCUMENTS

| | | | |
|---|---|---|---|
| 1308736 | 10/1962 | France | 60/284 |
| 36324 | 7/1974 | Japan . | |

OTHER PUBLICATIONS

SAE Technical Paper Series No. 900503.

*Primary Examiner*—David H. Brown

[57] ABSTRACT

A catalyst heating apparatus includes an electrically heated catalyst converter mounted in an exhaust passage of an internal combustion engine, the catalyst converter having a catalyst and a heating element for electrically heating the catalyst so that catalytic conversion of exhaust gases from the engine is carried out, a capacitor that is charged with electric power, in advance, before an ignition switch is turned on for starting operation of the engine, and a controller for applying a terminal voltage of the capacitor to the heating element of the catalyst converter when the ignition switch is turned on, so that a temperature of the heating element is increased owing to electric energy supplied from the capacitor to the converter through the controller for accelerating the rate of the catalytic conversion of the exhaust gases.

10 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR SUPPLYING POWER TO ELECTRICALLY HEATED CATALYST CONVERTER

BACKGROUND OF THE INVENTION (1) Field of the Invention

The present invention generally relates to a catalyst heating apparatus, and more particularly to an apparatus for supplying power to an electrically heated catalyst converter mounted in an exhaust passage of an internal combustion engine for catalytic conversion of exhaust gases from the engine.

(2) Description of the Related Art

Conventionally, in an automotive vehicle, a catalyst converter is mounted in an exhaust passage of an internal combustion engine for catalytic conversion of exhaust gases from the engine. Catalytic conversion signifies catalytic activity by a catalyst contained in the catalyst converter for accelerating oxidization of carbon monoxide and hydrocarbon pollutants in the exhaust gases and/or reduction of oxygen nitride pollutants in the exhaust gases. However, the catalytic activity or the catalytic conversion efficiency of a catalyst is relatively low when the temperature of the catalyst is still low; before a certain temperature level is reached. Once the engine starts operating, the temperature of the catalyst gradually increases due to the heat of exhaust gases passing into the exhaust passage, but if the engine is not warmed up, during a cold start, for example, and the temperature of exhaust gases is low, the temperature of the catalyst in the converter does not rise quickly to a required temperature level. Thus, there is a problem in that the engine in such a condition exhibits a poor fuel combustion efficiency, and the catalytic conversion efficiency of the catalyst is low.

In the prior art, there is a disclosure of a catalyst converter. For example, Japanese Laid-Open Utility Model Application No. 49-36324 discloses a conventional catalyst converter device for an internal combustion engine. This catalyst converter device includes a heater or a heating element provided within a catalyst converter on its upstream side in an exhaust passage of the engine. The heater, connected to a circuit of a starting motor of the engine, is energized when engine operation is started by the starting motor, and serves to preheat unburned components in exhaust gases, for catalytic conversion of the exhaust gases before the catalyst converter is filled with exhaust gases from the engine.

However, the above mentioned catalyst converter uses a battery as the power source for supplying electric power to the heater of the catalyst converter. A resistance of the heater is constant with respect to temperature changes of the heater, and the electric power supplied by the battery to the heater when the engine starts operating, especially during a cold start, cannot be adjusted in the case of the above catalyst converter device. Thus, there is a problem, in the case of the conventional device, in that it is difficult to attain a rapid increase of the temperature of the heater during a cold start of the engine, and in that it is difficult to shorten a time for the catalyst to heat up for efficient catalytic conversion of exhaust gases.

SUMMARY OF THE INVENTION

Accordingly, it is a general object of the present invention to provide an improved catalyst heating apparatus in which the above described problems are eliminated.

Another and more specific object of the present invention is to provide an apparatus for supplying power to an electrically heated catalyst converter, which apparatus can increase rapidly the temperature of the heater of the catalyst converter for efficient catalytic conversion of exhaust gases from the engine. The above mentioned object of the present invention can be achieved by a catalyst heating apparatus which includes an electrically heated catalyst converter mounted in an exhaust passage of an internal combustion engine, the catalyst converter having a catalyst and a heater for electrically heating the catalyst so that catalytic conversion of exhaust gases from the engine is carried out, a capacitor that is charged with electric power, in advance, before an ignition switch is turned on for starting operation of the engine, and a controller for applying a terminal voltage of the capacitor to the heater of the catalyst converter when the ignition switch is turned ON, so that a temperature of the heater is increased owing to the electric energy applied by the controller to the heater for accelerating the rate of the catalytic conversion of the exhaust gases. According to the present invention, it is possible to shorten a heat-up time of a heater of a catalyst converter during a cold start of the engine and rapidly increase the temperature of the catalyst. A terminal voltage of the charged capacitor is applied to the heater of the catalyst converter immediately after the ignition switch is turned ON. It is possible to preset a terminal voltage of the charged capacitor of the invention which voltage is higher than a voltage of electric power from the battery initially applied to the heater of the conventional catalyst converter when the same amount of electric power is consumed in both the converters.

Other objects and further features of the present invention will become apparent from the following detailed description when read in conjunction with the accompanying drawings.

DESCRIPTION OF THE PREFERRED EMBODIMENTS

Figure 1:
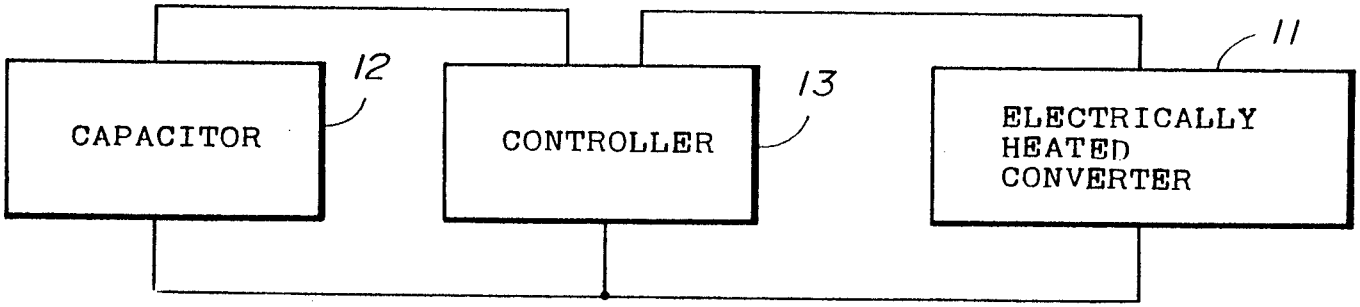
FIG. 1 is a block diagram showing a construction of a catalyst heating apparatus according to the present invention.

First, a description will be given of a construction of a catalyst heating apparatus according to the present invention, with reference to FIG. 1. In FIG. 1, this catalyst heating apparatus includes an electrically heated catalyst converter (EHC) 11 mounted in an exhaust passage of an internal combustion engine. This catalyst converter (EHC) 11 has a catalyst for performing catalytic conversion of exhaust gases from the engine, and a heater for electrically heating the catalyst so that the rate of catalytic conversion of the exhaust gases is accelerated. The catalyst heating apparatus includes a capacitor 12 which is charged with electric power in advance before an ignition switch in an automotive vehicle is turned ON, and a controller 13 for applying a terminal voltage of the charged capacitor 12 to the heater of the catalyst converter 11 at least when the ignition switch is turned ON, so that a temperature of the heater is increased owing to the electric energy applied by the controller to the heater for accelerating the rate of the catalytic conversion of the exhaust gases. According to the present invention, a terminal voltage of the charged capacitor 12 is applied to the heater of the electrically heated catalyst converter 11 by means of the controller 13. In other words, the capacitor 12 is used as the power source of the heater for electrically heating the catalyst of the catalyst converter 11. The terminal voltage of the capacitor can be adjusted to a level that is higher than a level of the constant voltage of the battery used in the conventional converter when the same amount of electric power is supplied in the both converters. Therefore, it is possible to rapidly increase the temperature of the catalyst up to a heat-up temperature level for a short time period by means of the heater which is suitably energized by the control of the controller 13.

Figure 2:
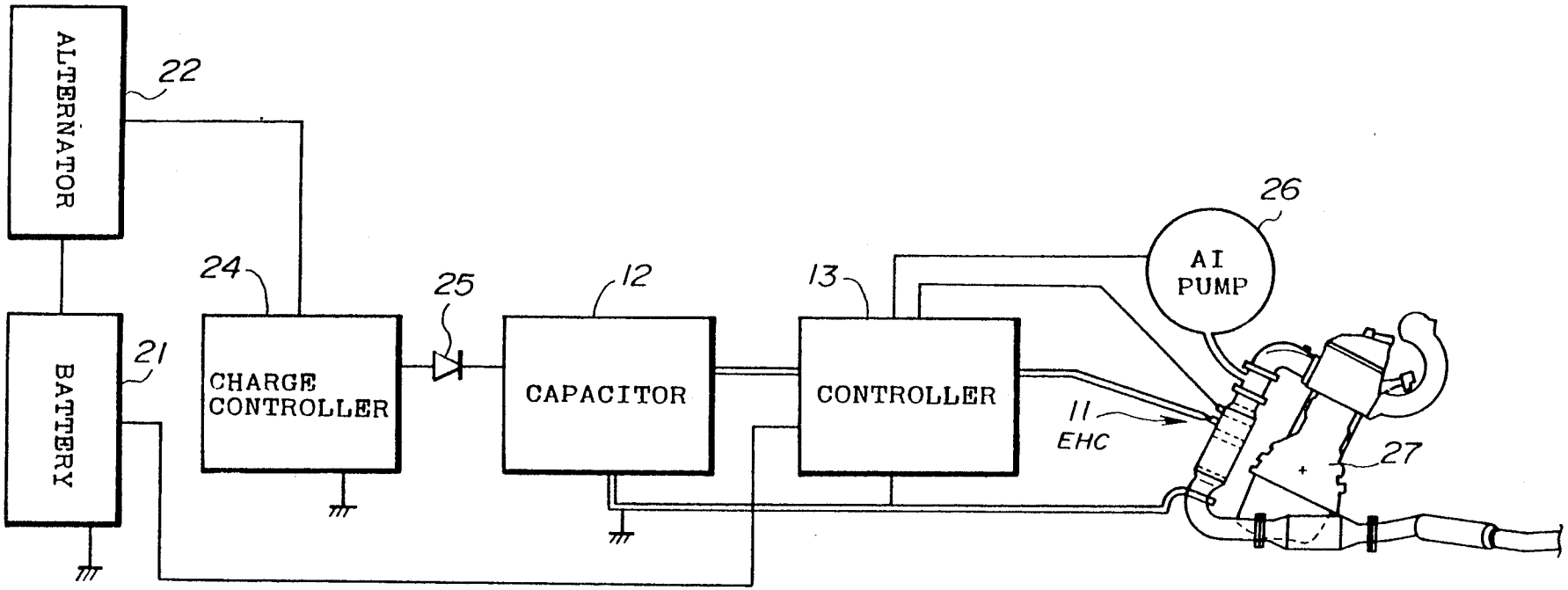
FIG. 2 is a view showing an internal combustion engine in which the catalyst heating apparatus of the present invention is mounted.

Next, a description will be given of a first embodiment of the present invention, with reference to FIG. 2. FIG. 2 shows a construction of an internal combustion engine to which a catalyst heating apparatus of the present invention is applied. In FIG. 2, those parts which are the same as those corresponding parts shown in FIG. 1 are designated by the same reference numerals, and a description thereof will be omitted.

In FIG. 2, a battery 21 is a power source of an automotive vehicle which supplies electric power to a starting motor of an internal combustion engine 27 and to the controller 13 of the catalyst heating apparatus when an ignition switch of the vehicle is turned ON. An alternator 22 generates electric power to be supplied to the battery 21, by converting mechanical energy generated by the engine into electric energy. The electric power from the alternator 22 is supplied to the battery 21, so that the electric power is stored in the battery 21.

In FIG. 2, a charge controller 24 supplies electric power received from the alternator 22 to the capacitor 12 based on detection signals indicative of engine operating conditions, which signals are sent from several sensors (not shown) to the charge controller 24. The sensors include a water temperature sensor, a throttle position sensor and other sensors mounted on the internal combustion engine. When it is detected by the detection signals that the quantity of electric power, generated by the alternator 22, is smaller than a predetermined level, the charge controller 24 receives electric power from the alternator 22 and supplies the same to the capacitor 12 via a diode 25 by increasing a voltage of the supplied power, so that the capacitor 12 is electrically charged with the electric power from the charge controller 24. The diode 25 is connected between the charge controller 24 and the capacitor 12 for preventing a counterflow of electric current from the capacitor 12 to the charge controller 24. This charge controller 24 also charges the capacitor 12 when the engine stops operation, so that the quantity of electric energy required at a discharge of the capacitor 12 is stored in advance when the ignition switch is turned ON.

As described above, a terminal voltage of the charged capacitor 12 is applied to the EHC 11 through the controller 13 so that the heater of the EHC 1 receives electric power for heating the catalyst of the EHC 11. The capacitor 12 at this time serves as the power source supplying power to the EHC 11, which replaces the battery supplying power to the heater of the conventional converter. An air injection pump (AI Pump) 26 is mounted in the engine for sending a secondary air to the exhaust passage upstream of the EHC 11, and the supplying of the secondary air is controlled by the controller 13. The catalytic conversion of exhaust gases passing through the exhaust passage is carried out by the EHC 11 together with this secondary air supplied by the AI pump 26, and the rate of the catalytic conversion is accelerated by thermal energy supplied through the heater of the EHC 11.

Figure 3:
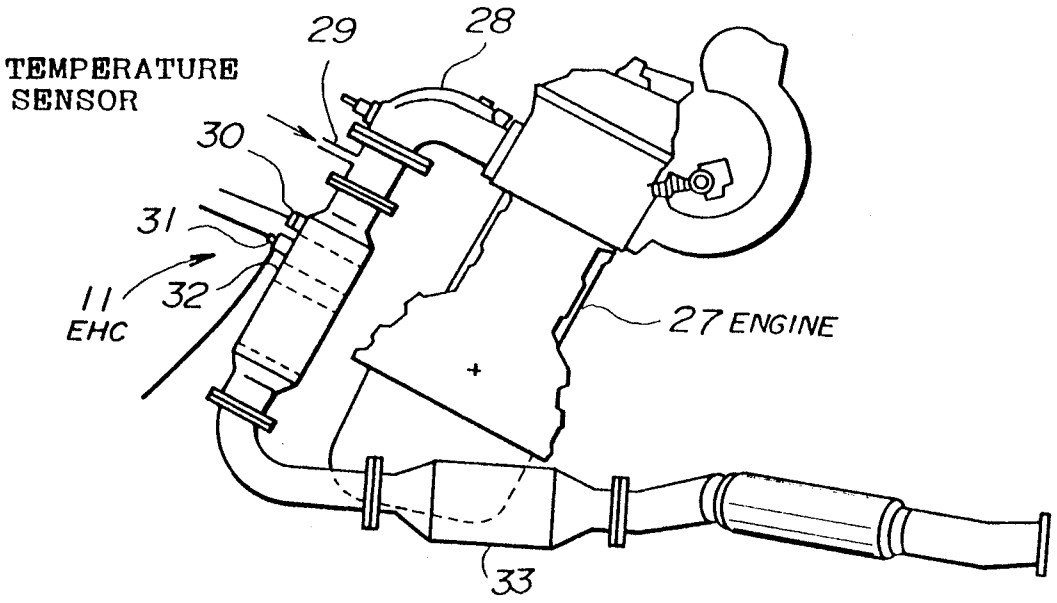
FIG. 3 is a view showing a detailed structure of the internal combustion engine, shown in FIG. 2, having the catalyst heating apparatus mounted therein.

FIG. 3 shows a detailed structure of the internal combustion engine in which the electrically heated catalyst converter is mounted. As shown in FIG. 3, an air inlet 29 is formed in the exhaust passage at a portion corresponding to the outlet of an exhaust manifold 28 of the engine, and, from the air inlet 29 a secondary air from the AI pump 26 is sent to exhaust gases passing through the exhaust passage. Downstream of the air inlet 27 in the exhaust passage of the engine 27, the electrically heated catalyst converter 11 according to the invention is provided. This catalyst converter 11 is made up of, for example, an electrically conductive metal monolith substrate with alumina coating, or an electrically heated monolith substrate on which a platinum catalyst is formed. Provided in a neighborhood of the EHC 11 in the exhaust passage are; a temperature sensor 30 which is formed with thermocouples and connected to the EHC 11 for detecting a temperature of a heating element of the EHC 11, a connecting wire 31 connected to a terminal of the EHC 11, and a connecting wire 32 connected to a terminal of the EHC 11 through which electric power from the battery is supplied to the EHC 11 via the controller 13. Also, a main catalyst converter 33 for catalytic conversion of exhaust gases is provided, separately from the EHC 11, in the exhaust passage downstream of the EHC 11.

Figure 4:
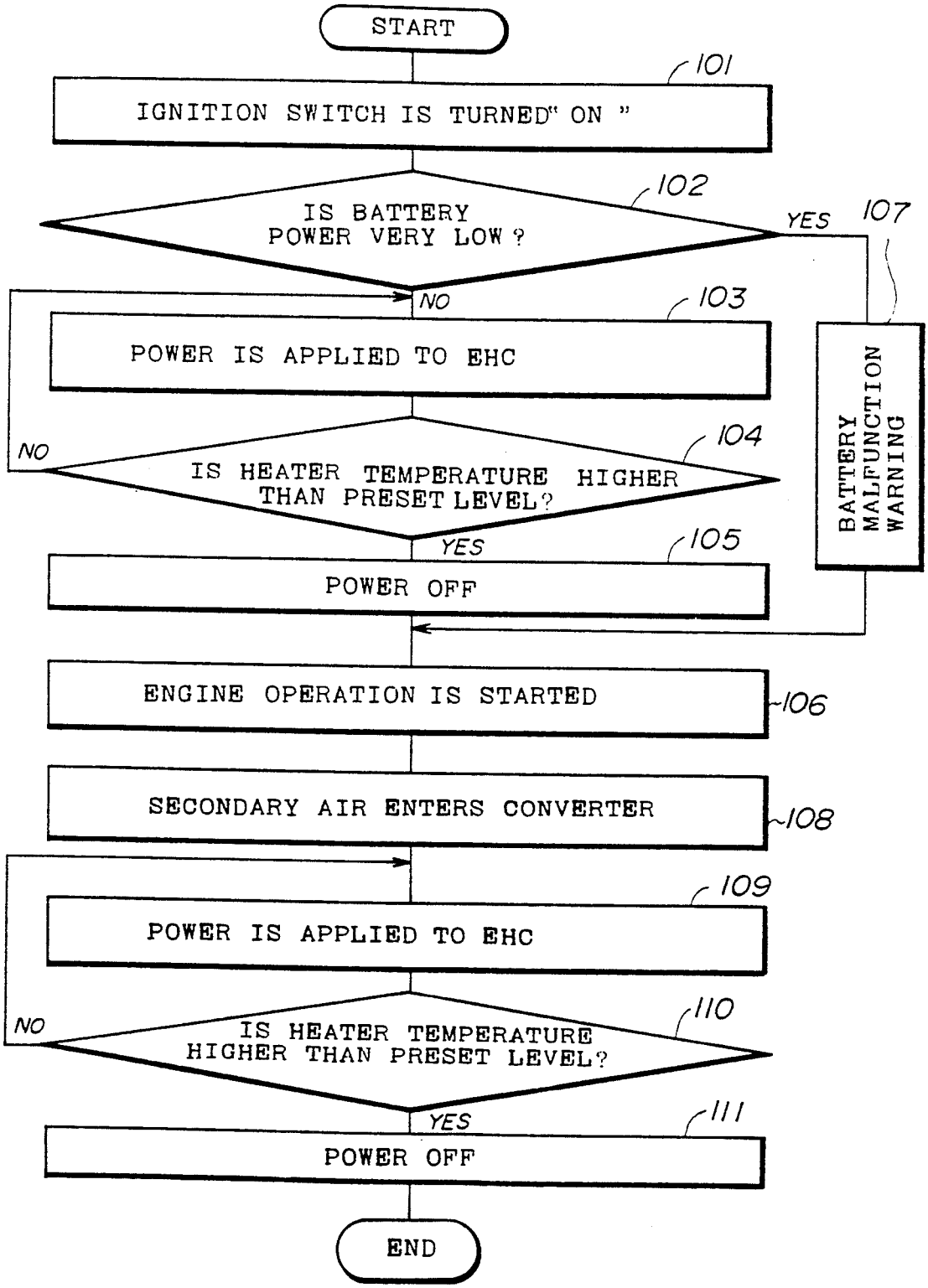
FIG. 4 is a flow chart for explaining the operations performed by the catalyst heating apparatus of the present invention.

FIG. 4 shows operations performed by the catalyst heating apparatus shown in FIG. 2. In step 101 of the flow chart shown, an ignition switch in an automotive vehicle is turned ON. In step 102, a voltage at a terminal of the battery 21 is checked to ascertain whether or not the voltage of the battery is lower than a given normal level. If the battery voltage is higher than the given level, the battery 21 is in normal condition and step 103 applies a terminal voltage of the capacitor 12 to the heater of the EHC 11 through the controller 13. Normally, the capacitor 12 is charged with electric power in advance before the ignition switch is turned ON. Provision of the capacitor 12 enables a level of electric power initially supplied to the EHC 11 to be much higher than a level of electric power supplied directly from the battery as in the conventional converter.

In step 104, a judgment is made based on a detection signal sent by the temperature sensor 30 to the controller 13 whether or not the detection temperature of the heater of the EHC 11 is higher than a predetermined temperature level. This temperature level is preset in view of a catalyst activation temperature which corresponds to a temperature at which the catalyst of the EHC 11 reaches a catalyst activation level. If the detection temperature of the heater is not higher than this predetermined level, the procedure returns back to the step 103 so that the electric power from the charged capacitor 12 is again supplied to the heater of the EHC 11. If the detected temperature of the heater is higher than the predetermined level, step 105 stops supplying electric power to the EHC 11, and immediately after the step 105, step 106 starts the engine operation. In the step 102 above, if it is detected that the battery voltage is lower than the prescribed level, step 107 gives a warning of a battery malfunction which may take place in the battery 21. After the step 107, the step 106 starts the engine operation without supplying the electric power to the EHC 11.

After the engine starts operation, step 108 allows a secondary air to enter the exhaust passage of the engine at a portion upstream of the EHC 11 by operating the AI pump 26 when the engine is in a given operating condition. This given operating condition is, for example, a condition when an air-fuel ratio feedback control is still not performed. The secondary air is mixed with exhaust gases from the exhaust manifold 28 of the engine, and the catalytic conversion of exhaust gases is carried out together with the secondary air when they pass through the EHC 11 and the main catalyst converter 33 downstream of the EHC 11 in the exhaust passage. By means of the catalyst in the EHC 11 and the main catalyst converter 33, unburned components of exhaust gases including carbon monoxide, hydrocarbon, and oxygen nitride pollutants are converted through oxidization and reduction, and the rate of catalytic conversion is accelerated by the secondary air. Thus, according to the present invention, it is possible to attain a high catalytic conversion efficiency.

Since the secondary air supplied by the AI pump 26 enters the exhaust passage in the step 108, the temperature of the heater of the EHC 11 is somewhat lowered. In step 109, a terminal voltage of the capacitor 12 is again applied to the heater of the EHC 11 under control of the controller 13. Similarly, step 110 judges whether or not the temperature of the heater of the EHC 11 is higher than a predetermined temperature level. The supply of the electric power to the EHC 11 is repeated until the heater temperature rises to such a predetermined level corresponding to a catalyst activation temperature. When the temperature of the heater of the EHC 11 is higher than the predetermined level, step 111 stops applying a terminal voltage of the capacitor 12 to the EHC 11.

The above described procedure (steps 101 through 111 in FIG. 4) is carried out each time the engine operation is started by turning the ignition switch ON. After the engine started operation, the charge controller 24 serves to supply electric energy, generated by the alternator 22, to the capacitor 12 via the diode 25 in a way that the engine is not subjected to a great load at a time. And, the capacitor 12 is charged with the electric power supplied thereto.

Figure 5:
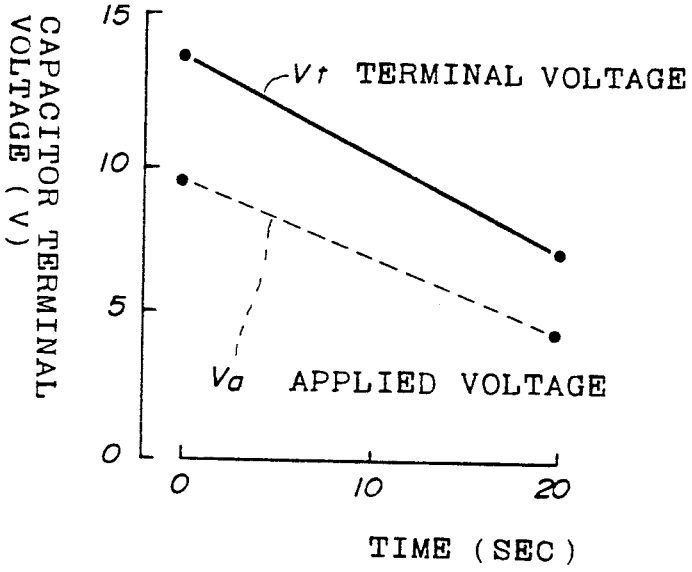
FIG. 5 is a time chart showing a relationship between the applied voltage of the heater and the terminal voltage of the capacitor.

FIG. 5 shows a time chart which indicates changes in the terminal voltage of the capacitor 12 and the applied voltage of the EHC 11 with respect to the elapsed time since the ignition switch is turned ON. For the sake of convenience, assume that the resistance of the EHC 11 is 0.01 ohm, the resistance of the connecting wire between the EHC 11 and the capacitor 12 is 0.003 ohm, and the voltage drop in the controller 13 is 1.4 volt constant. In the case shown in FIG. 5, it is assumed that the amount of electric power, which is substantially the same as that of the conventional converter in which electric power of 4,000 W from the battery is applied directly to the heater in approx. 20 seconds, is supplied to the heater of the EHC 11. As shown in FIG. 5, the terminal voltage (indicated by "Vt" in FIG. 5) of the capacitor 12 shows the maximum level at a time when the ignition switch has just been ON (the elapsed time $t=0$), and the terminal voltage Vt is gradually changed in inverse proportion with respect to the elapsed time since the ignition switch was turned ON. The applied voltage (indicated by "Va" in FIG. 5) when the terminal voltage Vt of the capacitor 12 is actually applied to the EHC 11 shows the maximum level (which is lower than the maximum level of the terminal voltage Vt) at a time when the ignition switch has been just turned ON, and is changed in inverse proportion with respect to the elapsed time.

Figure 6:
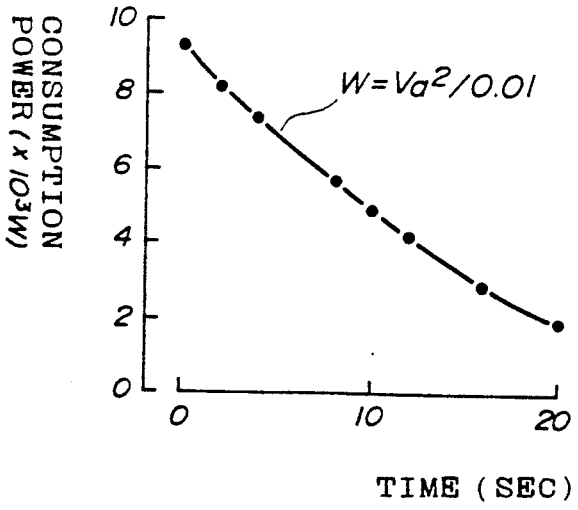
FIG. 6 is a time chart showing a characteristic of the consumption power of the heater of the catalyst converter.

In a case of the conventional converter, the electric power supplied from the battery to the catalyst converter, and the consumption power W consumed in the converter is, for example, 4000 W constant with respect to the elapsed time and it cannot be adjusted. In this embodiment of the invention, the consumption power W consumed in the EHC 11, which power is represented by $W=Va^2/0.01$ (the resistance of the EHC: 0.01 ohm), shows the maximum level when the ignition switch has just been turned ON ($t=0$) similarly. As can be seen from FIG. 6, the EHC 11 shows a high consumption power (approx. 9000 W) at the ignition-ON time ($t=0$), which is much higher than that of the consumption power W in the conventional catalyst converter. Subsequently, the consumption power W is gradually decreased with respect to the elapsed time. However, it should be noted that in approx. 10 seconds since the ignition switch is turned ON, the amount of electric power supplied to the EHC 11 of the invention is greater than that of the corresponding power in the conventional converter. Thus, according to the present invention, it is possible to supply a great amount of electric power to the EHC 11 during the starting operation of the engine, thus allowing a rapid increase of the temperature of the EHC 11 after the ignition switch was turned ON.

It should be noted that the electrically heated catalyst converter (EHC) 11 of the invention does not easily break because it is maintained at a relatively low temperature if a great amount of electric current flows across the converter 11. The time for the catalyst to be in a heat-up condition is thus shortened, and it is possible to reduce the heat dissipation of the heater of the converter.

Figure 7:
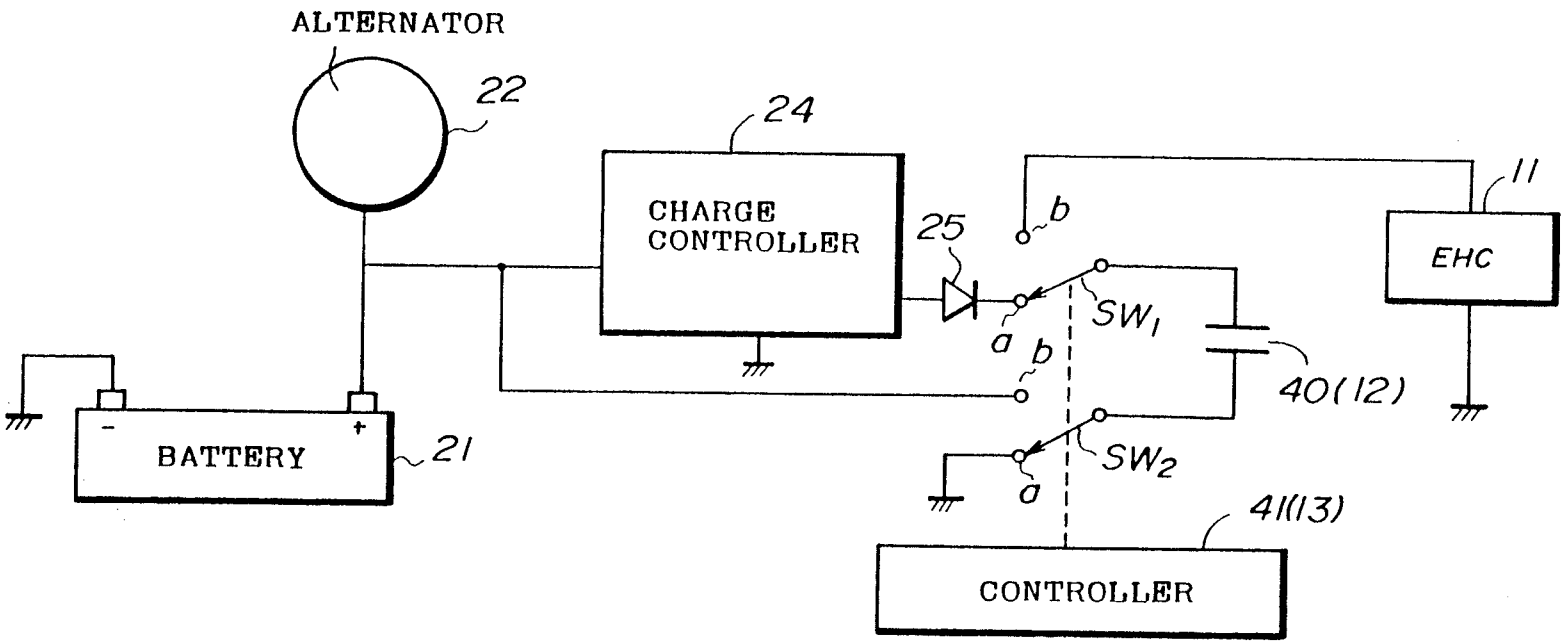
FIG. 7 is a diagram showing a catalyst heating apparatus in a second embodiment of the present invention.

Next, a description will be given of a second embodiment of the present invention, with reference to FIG. 7. In FIG. 7, those parts which are the same as those corresponding parts in FIG. 2 are designated by the same reference numerals, and a description thereof will be omitted. A catalyst heating apparatus shown in FIG. 7 includes a capacitor 40 corresponding to the capacitor 12 in FIG. 2, a controller 41 corresponding to the controller 13, and a pair of switching members SW1 and SW2 connected at both ends of the capacitor 40. The capacitor 40 can store a relatively great amount of capacitance and has a withstanding voltage of 1 to 3 volts.

In a modified catalyst heating apparatus, a set of capacitors connected in series one another would be used instead of the above capacitor 40, so that a higher voltage is generated due to electric power stored in the set of capacitors. Each of the switching members has two connection points "a" and "b", and both the switching members SW1 and SW2 are together connected to selectively one of the corresponding connection points "a" and "b". The connection point "a" of the switching member SW1 is coupled to a terminal of the diode 25, and the connection point "b" thereof is coupled to a heater terminal of the EHC 11. The connection point "a" of the switching member SW2 is grounded, and the connection point "b" thereof is coupled to a terminal of the alternator 22.

In the catalyst heating apparatus shown in FIG. 7, the switching members SW1 and SW2 are normally connected to the connection point "a" under the control of the controller 41. Thus, a terminal voltage of the alternator 22 is applied to the capacitor 40 through the charge controller 24 via the switching member SW1 so that the capacitor 40 is charged with electric energy generated by the alternator 22.

After the ignition switch is turned ON, the controller 41 permits, before the engine starts operating, an electrical connection between the capacitor 40 and the converter 11 by connecting the switch SWl to the connection point "b", coupled to the EHC 11, and connecting the switch SW2 to the connection point "b", coupled to the alternator 22 and the battery 21. A terminal voltage of the charged capacitor 40 is applied to the EHC 11 via the switch SWl, so that a temperature of the heating element of the EHC 11 is increased owing to the electric power supplied from the capacitor 40.

When it is detected, in response to the detection signal from the temperature sensor 30, that the temperature of the heater of the EHC 11 is higher than a predetermined temperature level corresponding to a catalyst activation temperature, the controller 41 permits an electrical connection between the capacitor 40 and the charge controller 21 by connecting the switch SW1 to the connection point "a", coupled to a terminal of the diode 25 connected to the charge controller 24, and connecting the switch SW2 to the connection point "a" connected to a ground. The application of the terminal voltage of the capacitor 40 to the converter 11 is thus stopped, and at the same time the capacitor 40 is charged with electric power from the alternator 22.

In this second embodiment of the invention, the catalyst heating apparatus includes an air injection pump (not shown) for sending a secondary air into the exhaust passage of the engine upstream of the EHC 11, which is the same as the air injection pump 26 shown in FIG. 2. The catalyst heating apparatus shown in FIG. 7 also includes a temperature sensor (not shown) for generating a signal indicative of a temperature of the heating element of the EHC 11, which is the same as the temperature sensor 30 shown in FIG. 3. It should be noted that almost all the electric energy stored in the capacitor 40 can be used for increasing a temperature of the heating element of the EHC 11, and that the initial voltage applied to the EHC 11 can be easily preset to a high level, allowing a rapid increase of the temperature of the heating element of the EHC 11.

Further, the present invention is not limited to the above described embodiments, and variations and modifications may be made without departing from the scope of the present invention.

What is claimed is:

1. A catalyst heating apparatus comprising:

an electrically heated catalyst converter mounted in an exhaust passage of an internal combustion engine, said catalyst converter having a catalyst and a heater for electrically heating said catalyst so that catalytic conversion of exhaust gases from said engine is carried out;

a capacitor that is charged with electric power, in advance, before an ignition switch is turned on for starting operation of the engine; and control means for applying a terminal voltage of said capacitor to said heater of said catalyst converter when the ignition switch is turned ON, so that a temperature of said heater is increased owing to the electric energy applied by said control means to said heater for accelerating the rate of the catalytic conversion of the exhaust gases.

2. A catalyst heating apparatus as claimed in claim 1, wherein said control means stops applying a terminal voltage of said capacitor to said heater of said converter when it is detected that a temperature of said heater is higher than a predetermined level, said predetermined level corresponding to a temperature at which said catalyst reaches a catalytic activation condition.

3. A catalyst heating apparatus as claimed in claim 1, further comprising detection means for generating a signal indicative of a temperature of said heating element, said control means continuing to apply a terminal voltage of said capacitor to said converter when it is detected, in response to the signal generated by said detection means, that the temperature of said heating element is higher than a predetermined level corresponding to a temperature of at which said catalyst reaches a catalytic activation condition.

4. A catalyst heating apparatus as claimed in claim 1, further comprising an air injection pump that sends a secondary air into the exhaust passage of the engine upstream of said converter when the engine is in a given operating condition after the engine operation is started.

5. A catalyst heating apparatus as claimed in claim 4, wherein said control means applies a terminal voltage of said capacitor to said converter after a secondary air is sent by said air injection pump into the exhaust passage.

6. A catalyst heating apparatus as claimed in claim 1, further comprising a pair of switches, provided at both ends of said capacitor, an alternator and a charge controller controlling an output of electric power supplied from said alternator, said control means, before the ignition switch is turned on, permitting an electrical connection between said capacitor and said charge controller by connecting one of said switches to a connection point coupled to a terminal of said charge controller, and connecting the other switch to a connection point connected to a ground, said capacitor thus being charged, in advance, with electrical power supplied from said alternator through said charge controller.

7. A catalyst heating apparatus as claimed in claim 6, wherein said control means, after the ignition switch is turned on, permits an electrical connection between said capacitor and said converter by connecting one of said switches to a connection point coupled to said converter, and connecting the other switch to a connection point coupled to said alternator, so that a temperature of said heating element is increased owing to electric power being supplied from said capacitor to said converter through said control means.

8. A catalyst heating apparatus as claimed in claim 6, wherein said control means stops applying a terminal voltage of said capacitor to said converter when it is detected that a temperature of said heating element is higher than a predetermined level, said predetermined level corresponding to a temperature at which said catalyst reaches a catalytic activation condition.

9. A catalyst heating apparatus as claimed in claim 6, further comprising an air injection pump which sends a secondary air into the exhaust passage of the engine upstream of said converter when the engine is in a given operating condition after the engine operation is started.

10. A catalyst heating apparatus as claimed in claim 6, further comprising detection means for generating a signal indicative of a temperature of said heating element, said control means continuing to apply a terminal voltage of said capacitor to said converter when it is detected, in response to the signal generated by said detection means, that the temperature of said heating element is not higher than a predetermined level corresponding to a temperature at which said catalyst reaches a catalyst activation condition.

* * * * *